United States Patent Office 2,853,846
Patented Sept. 30, 1958

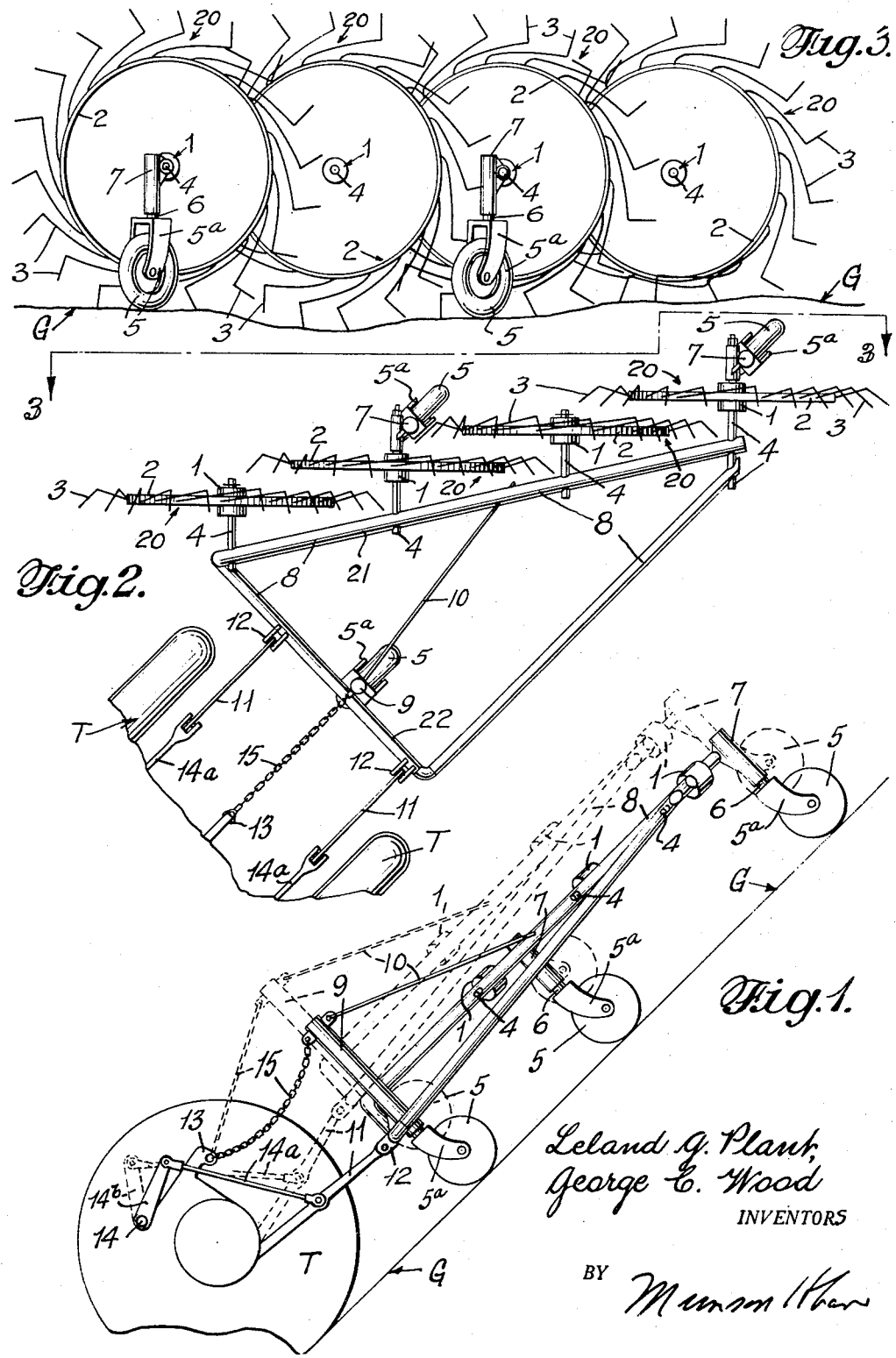

2,853,846

ROTARY RAKING ATTACHMENT FOR TRACTORS

Leland G. Plant and George C. Wood, Edenton, N. C.; Pattie Louise Moore Plant, executrix of said Leland G. Plant, deceased Application February 8, 1956, Serial No. 564,211

5 Claims. (Cl. 56—377)

The invention relates to raking apparatus, and more particularly to a tractor attachment for raking hay by means of rotary raking members such as tine equipped wheels grouped in echelon on axles rigidly positioned upon a structure of which the entire weight (except such portion thereof as may be controllably transmitted to the ground through said tines) is supported upon pedestals each having a freely swiveling ground wheel. In distinction to prior tractor attachments for raking purposes as devised by others the raking members of our invention do not float relative to a frame structure in supported relation thereto and the angularity of said members relative to the tractor by which towed is not at all directionally controlled by the ground wheels on which said structure is supported.

When in a raking position the present invention utilizes the two lower links of a three-point hitch with which modern tractors are generally equipped as the means for its directional control. As thus applied these lower links float freely in vertical planes but are restrained from horizontal movement relative to the tractor to which they are pinned at their forward ends. By utilizing the top point of attachment in this typical three-point tractor hitch and applying power means for lifting the lower link bars through connecting linkage to crank arms on a lift shaft common to tractor hitch mechanisms our invention provides means for raising the entire raking attachment in a generally horizontal plane in distinction to tilting it upwards to clear the ground for road travel or to facilitate sharp turns.

Briefly stated our invention comprises the combination with a tractor having a power lift mechanism including a pair of transversely spaced vertically swingable links, of a floating raking attachment comprising a frame hving mounted thereon a plurality of freely rotatable raking members having horizontal axes disposed obliquely to the direction of travel, connecting means provided at transversely spaced points on said frame for pivotally attaching the frame to said links to allow free movement of the frame in a vertical plane and serving to prevent movement thereof in a lateral direction relative to the direction of movement of the tractor, said raking attachment including ground engaging means for supporting the frame in an operative position at a fixed distance above the ground independently of said links, said connecting means providing the sole means for preventing lateral movement of the frame and said ground engaging means including at least three triangularly spaced members serving as the sole means for supporting the frame at a fixed distance from the ground.

The invention will be more readily understood by reference to the accompanying drawings and the following detailed description in which a specific embodiment of the invention is set forth by way of illustration rather than by way of limitation.

In the drawings:

Fig. 1 is a side elevation of a caster wheel supported frame showing raking wheel hubs mounted on axle shafts positioned thereon and the partial outline in section of a tractor to which the frame is attached by a typical three-point hitch arrangement, solid lines showing the position of the frame when being directionally towed by the tractor for raking with wheels of which only the hubs are here shown, and broken lines indicating the position of these parts when supported by the tractor in a raised position, clear of the ground for road travel, certain parts being broken away or omitted in this figure;

Fig. 2 is a plan view of this raking apparatus as shown in Fig. 1, except that in this figure the raking wheels with their tines are illustrated; and Fig. 3 is the rear elevation of this rake, viewed in plane 3—3 of Fig. 2.

The principal parts of the apparatus shown in the drawing will now be briefly described, followed by a more detailed description of the relation of such parts to one another and a description of the mode of operation of the apparatus as a whole.

Referring to the drawings, reference numeral 1 refers to the hubs of raking wheels 20 which are provided with rims 2 having tines 3 mounted on the rims. Axle shafts 4 are provided on which the hubs 1 are rotatably mounted. Supporting caster wheels 5 are mounted in horns or brackets 5a, from which horn stems 6 rise vertically. Pedestals 7 are bored vertically for rotatable insertion of the stems 6 and are bored horizontally for clamping on axle shafts 4. A frame structure 8 is rigidly assembled in a triangular pattern on which the shafts 4 are rigidly mounted. Pedestal 9 is bracketed to frame 8 and has an extended vertical bore for rotatable insertion of the stem 6 attached vertically to one of the caster wheel horns 5a. The truss member 10 extends from a section 21 of the frame 8 on which the shafts 4 are positioned to the upper end of the pedestal 9.

The reference numeral 11 denotes lower links of a typical three-point hitch on a conventional tractor T to which they are pivotally attached at their forward ends. Sockets or brackets 12 are provided on the section 22 of frame 8 to which pedestal 9 is bracketed, and each socket is adapted to be pinned to one of the links 11. The reference numeral 13 denotes the top point of attachment of the three-point hitch of the tractor T which is indicated in outline. Reference numeral 14 denotes a lift shaft adapted to be rotated by hydraulic power means (not shown in detail), said lift shaft being provided with crank arms 14b having connecting rods 14a for raising or lowering links 11. Reference numeral 15 denotes a chain of adjustable length attachable to the upper end of top attachment point 13 of pedestal 9. The tractor T is indicated by its rear wheels which are shown partially broken away. The ground surface traversed by the above parts is generally indicated by the reference letter G.

In its preferred form this tractor attachment may have three or more rotary raking members 20, four being here illustrated, each having a hub 1, a rim 2, and tines 3 projecting flexibly from said rim. Each hub 1 is rotatably mounted on an axle shaft 4, and alternately spaced shafts, two as here shown, are supported at a fixed height above the ground surface G, by a caster type ground wheel 5 and horn 5a, with stem 6, rotatably inserted in the vertical bore of a pedestal 7, clamped upon the end of the supported shaft where it projects from the hub mounted thereon. The other ends of these shafts 4 are rigidly attached in substantially horizontal positions upon one leg 21 of the triangular shaped structural frame 8. Remaining axle shafts 4, two as here shown, are rigidly positioned also in a substantially horizontal plane upon the same leg 21 of frame 8, each rotatably supporting the hub 1, of a raking member 20 so that said members will all revolve in parallel substantially vertical or slightly inclined planes as desired, one member overlapping the other.

The base 22 of the triangular shaped frame 8, opposite its leg on which shafts 4 are positioned, rests upon a pedestal 9, bracketed thereto, and a third ground wheel 5 of the caster type with horn 5a having its stem 6 rotatably inserted in the pedestal 9, supports the frame 8 at approximately the same height above the ground as where supported by the pedestals 7, clamped upon the ends of two axle shafts as above described. For structural purposes pedestal 9 is extended above the level of frame 8 and truss member 10 may be applied in tension between the top of this pedestal and a mid-point on the frame leg 21, completing the assembly of a stable vehicle carried wholly on freely swiveling ground wheels for supporting a group of rotary overlapping raking members revolving in upright planes with their hubs approximating a constant elevation above the ground directly traversed as this vehicle is towed by a tractor T.

When the vehicle as above described is towed in a direction oblique to the planes of its rotary raking members 20, contact of their tines 3, causes them to revolve and if the foremost raking member cocupies a plane in advance of its adjacent member, hay raked by the tines on the first member falls in the path of tines on this adjacent member and so on to one side of the apparatus where it is deposited in a windrow. However, this raking operation produces a thrust against the raking members at right angles to the direction in which they are being towed which causes the vehicle to swerve to one side of the path in which it is being towed so that only a narrow, irregular swath is raked, and on sloping ground it may swing entirely clear of the desired path if not restrained. In prior art wherever the rotary raking members are positioned in fixed relation to the carriage frame on which mounted, they are held in a desired path by incorporating directional control in the means by which the vehicle is wholly or in part supported. The support means thus employed may either be ground wheels rigidly axled upon the carriage frame or the tractor itself, upon which the frame of the raking attachment is in part supported.

In the present invention attachment of the rake to a tractor by which it is towed controls direction of the rake without in any way serving as its support means while in a raking position. This is accomplished by utilizing what are termed the lower links here designated as 11, in a three-point tractor hitch. These links are pinned at their forward ends to the tractor chassis and guided so that their other ends projecting to the rear of the tractor can move up and down in a substantially vertical direction only. This movement may at will be either free or power actuated by the left shaft 14 and crank arms 14b, through connecting rods 14a, or these links 11 may be positioned at a fixed height as desired. The sockets or brackets 12, are positioned on a leg 22 of the frame 8, spaced to approximate the distance between said lower links 11 and adapted to be pinned to these links. When raking, the rear ends of these links thus pinned to the frame 8 are freed fro vertical movement so that the tractor bears no supporting relation to the raking apparatus although serving as the means for its directional control through the above described links. Angularity of the planes in which raking members 20 revolve, to the direction in which they are towed by the tractor is established by positioning the sockets 12 upon frame 8 as desired, and although not so shown on the drawings these sockets may have a series of holes for selective attachment to the links 11, providing for altering the space between the frame member and point at which each socket 12 is pinned to one of the links 11.

When not raking, as in road travel, our invention utilizes what in a three-point tractor hitch is designated as the top attachment point 13. A chain 15, or equivalent linkage of adjustable length is attached to the tractor at point 13 and to the upper end of pedestal 9, at a height level with or above the elevation of point 13, but so adjusted that when the ground wheel below this pedestal is riding on the ground chain 15 is slightly slack. By power elevating the links 11, which may be accomplished by rotating the lift shaft with its crank arms 14 counterclockwise as viewed in Fig. 1, through connecting rods 14a, the forward end of frame 8, where pinned to these links, can be raised. But after rising a short distance chain 15 becomes taut and further elevation of the links 11 causes the rear end of frame 8 with the raking members to rise so that the whole raking apparatus including pedestals and ground wheels 5, can be lifted clear of the ground and held with its frame in a substantially level position.

As ordinarily attached to a tractor T by its three-point hitch the frame of other raking attachments depends for support at its forward point upon the lower links 11 of this hitch to which it is pinned. A disadvantage of this arrangement is that as the tractor rides over uneven ground it pitches forward and back, alternately raising and lowering the height of said links where pinned to the rake frame and causing its raking wheel members 20 to lean backward, then forward, a condition avoided in our invention wherein the raking members are supported more nearly in the desired upright position. The forward ground wheel 5 here employed to make the frame 8 wholly self-supporting in a substantially level position facilitates its handling when being attached to or detached from the tractor and enables all of the rotary raking members to be mounted on axle shafts rigidly positioned relative to one leg 21 of its triangular frame structure. This feature of our invention lends advantage to its use in combination with rotary raking members having tines 3, of sufficient elasticity to spring outwardly or inwardly relative to their hubs, said tines being equipped with foot extensions (shown in the Plant Patent No. 2,670,588) that scribe an undulating ground surface of varying distance below the wheel rims 2, as illustrated in Fig. 3.

The invention has been described in detail for the purpose of illustration, but it will be obvious that numerous modifications and variations may be resorted to within the scope of the appended claims without departing from the spirit of the invention.

We claim:

1. In combination with a tractor having a power lift mechanism including a pair of transversely spaced vertically swingable links, a raking attachment comprising a frame having mounted thereon a plurality of freely rotatable raking members having horizontal axes disposed obliquely to the direction of travel, connecting means provided at transversely spaced points on said frame for pivotally attaching the frame to said links to allow free movement of the frame in a vertical plane and serving to prevent movement thereof in a lateral direction relative to the direction of movement of the tractor, said raking attachment including ground engaging means for supporting the frame in an operative position at a fixed distance above the ground independently of said links, said connecting means providing the sole means for preventing lateral movement of the frame and said ground engaging means including at least three triangularly spaced members serving as the sole means for supporting the frame at a fixed distance from the ground.

2. The combination as set forth in claim 1, together with a flexible element connected at one end thereof to said frame and adapted at its other end for connection to said tractor at a point above said links, said flexible element being slack when said ground engaging members rest upon the ground but being taut when said lift mechanism is raised to elevate said ground engaging members from the ground.

3. The combination as set forth in claim 1, wherein the raking members are mounted on said frame in echelon.

4. The combination as set forth in claim 1, wherein the ground engaging means comprises freely swivelling casters.

5. The combination as set forth in claim 1, wherein the frame is triangular and includes a front cross bar and a rigid side bar, and said ground engaging means includes at least one member mounted on said front cross bar.

References Cited in the file of this patent

UNITED STATES PATENTS

| | | |
|---|---|---|
| 2,602,280 | Crowe et al. | July 8, 1952 |
| 2,658,324 | Johnson | Nov. 10, 1953 |
| 2,727,351 | Plant | Dec. 20, 1955 |

FOREIGN PATENTS

| | | |
|---|---|---|
| 146,574 | Australia | May 21, 1952 |
| 674,797 | Great Britain | July 2, 1952 |
| 158,426 | Australia | Aug. 24, 1954 |